(No Model.) 3 Sheets—Sheet 2.
A. J. ADAMSON.
ROLLING HARROW AND CULTIVATOR.
No. 399,644. Patented Mar. 19, 1889.
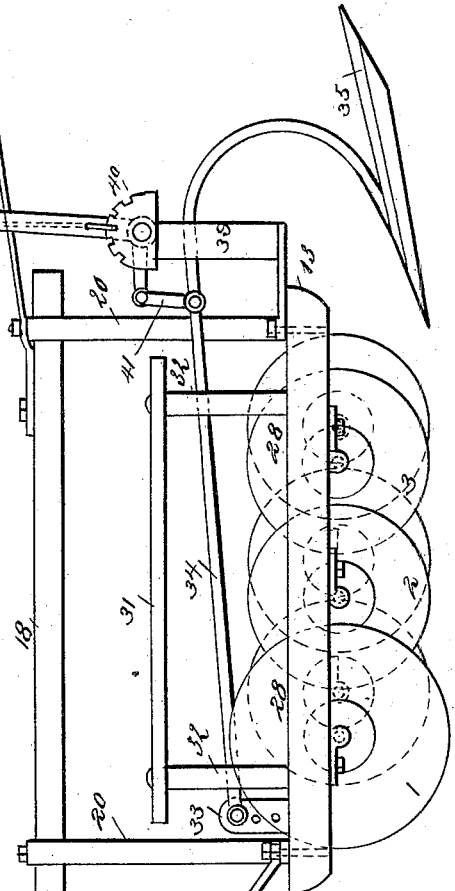
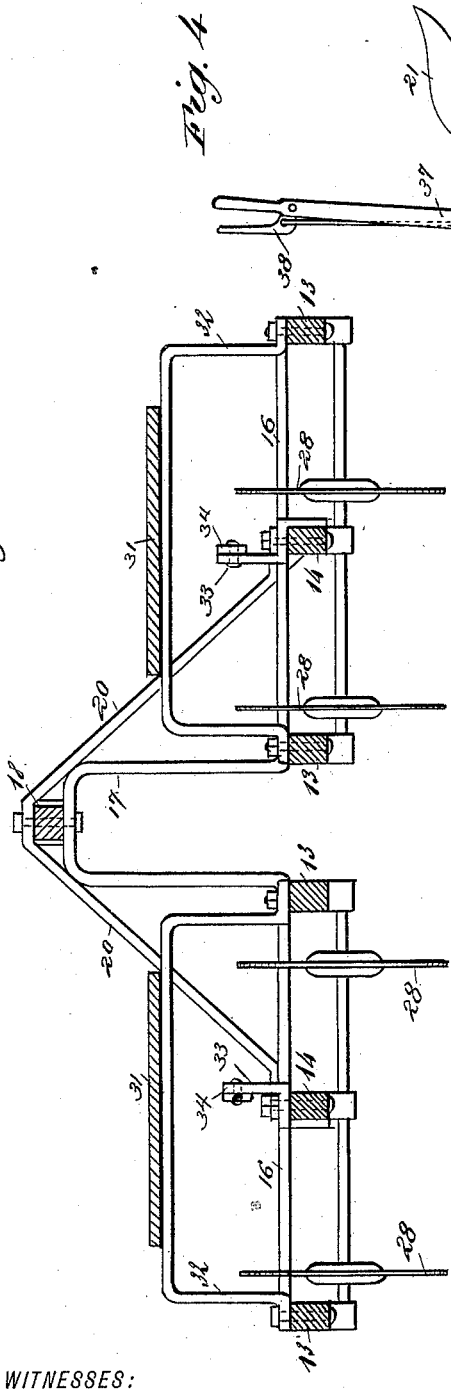
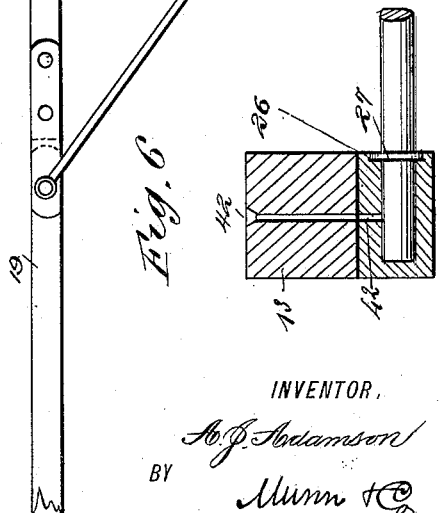
WITNESSES:
C. Neveux
E. M. Clark
INVENTOR,
A. J. Adamson
BY
Munn & Co
ATTORNEYS,

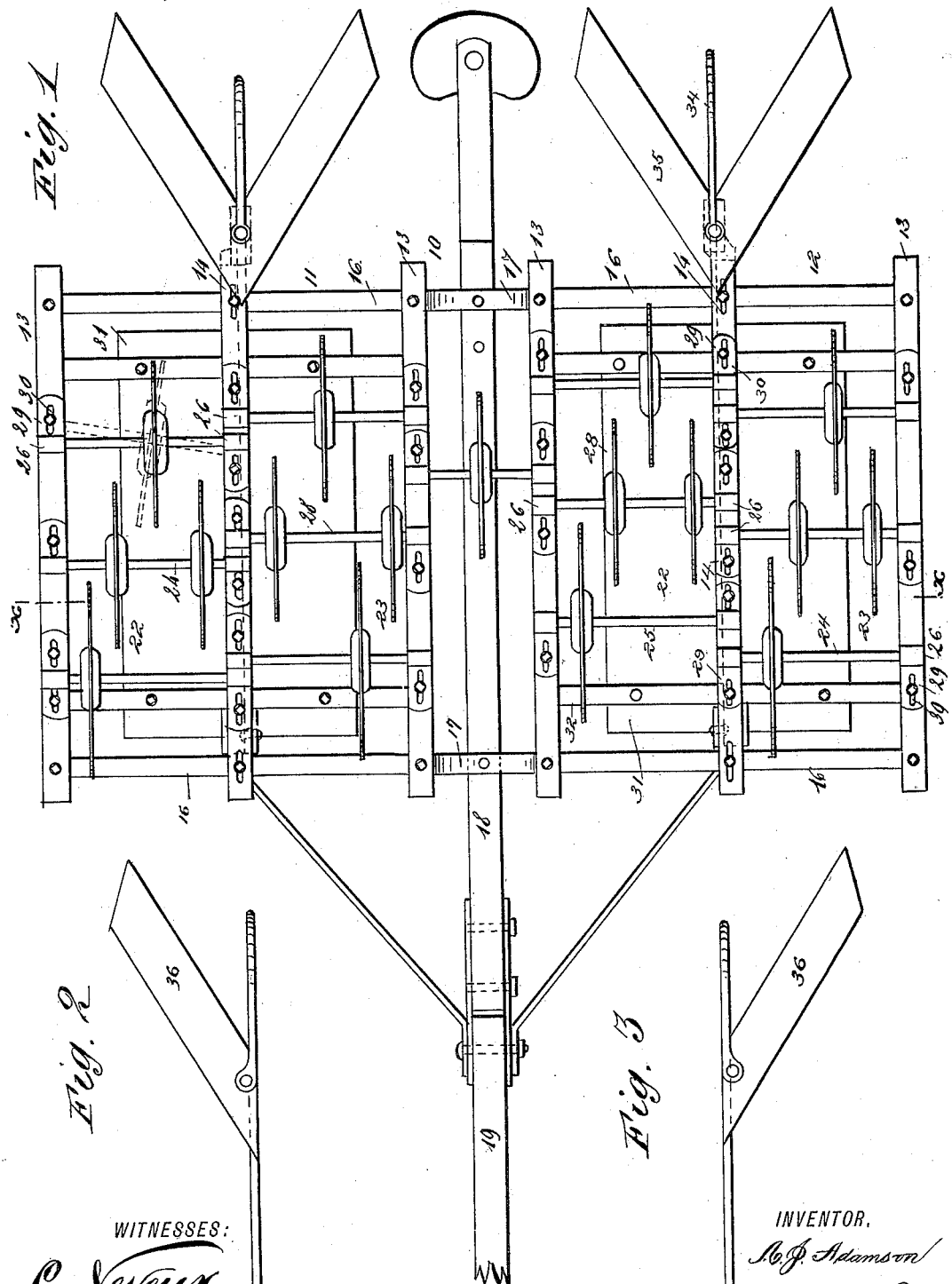

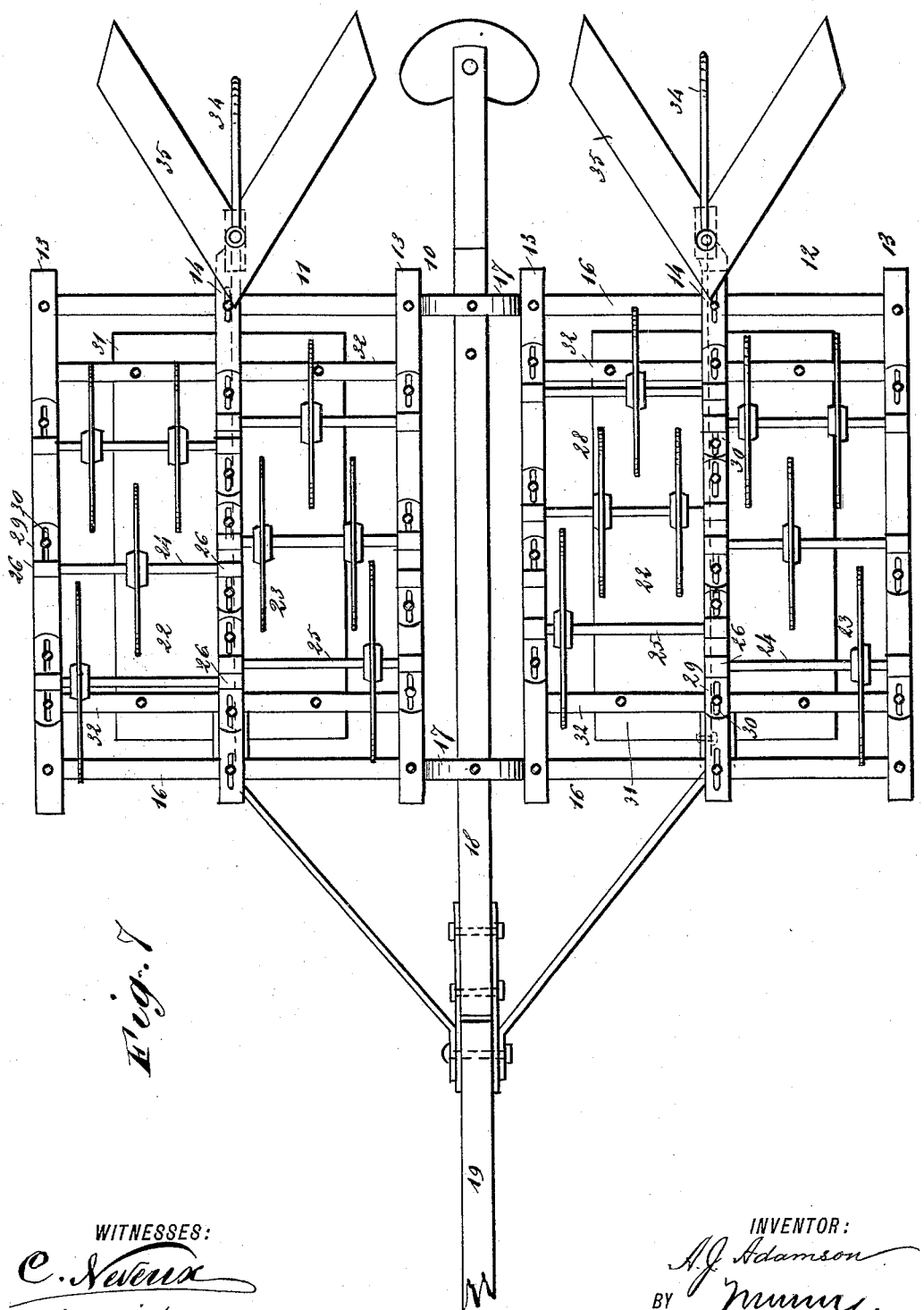

UNITED STATES PATENT OFFICE.

ANDREW J. ADAMSON, OF SABETHA, KANSAS.

ROLLING HARROW AND CULTIVATOR.

SPECIFICATION forming part of Letters Patent No. 399,644, dated March 19, 1889.

Application filed 22, 1888. Serial No. 274,638. (No model.)

*To all whom it may concern:*

Be it known that I, ANDREW JACKSON ADAMSON, of Sabetha, in the county of Nemaha and State of Kansas, have invented a new and Improved Rolling Harrow and Cultivator, of which the following is a full, clear, and exact description.

My invention relates to an improvement in rolling harrows and cultivators, and has for its object to provide an improvement which may be used as a harrow and cultivator and also employed for cutting stalks, and wherein the tongue may be so coupled to the body as to permit the improvement to readily pass over rough ground and relieve the horses from undue strain; and the further object of the invention is to so locate the colters that one will automatically clean the other.

The invention consists in the construction and combination of the several parts, as will be hereinafter fully set forth, and pointed out in the claims.

Reference is to be had to the accompanying drawings, forming a part of this specification, in which similar figures of reference indicate corresponding parts in all the views.

Figure 1 is a bottom plan view of the improvement. Figs. 2 and 3 show modified forms of the points or shovels adapted for attachment to the improvement. Fig. 4 is a side elevation. Fig. 5 is a transverse vertical section on the line *x x* of Fig. 1. Fig. 6 is a detail sectional view of one of the bearings of the colter-shafts; and Fig. 7 is a bottom plan view of the device, illustrating another arrangement of the colters.

In carrying out the invention the frame 10 is divided into two spaced sections, 11 and 12, said sections consisting of parallel longitudinal side beams, 13, and central longitudinal beams, 14, the several beams being connected at each end by a continuous metal rod or bar, 16, which bar is attached to the several beams 13 and 14, and is bent upward to form the vertical yoke 17, which yoke spans the space intervening the several frame-sections 11 and 12, the purpose of this construction being to admit of the passage of the several sections at each side of a row of plants.

The shaft 18 is secured to the upper portion of the yoke 17 and projects outward from the forward part of the frame, at which point the tongue 19 is pivoted to the shaft, as best shown in Fig. 1, said pivotal connection being effected by means of straps attached to each side of the shaft, between the projecting ends of which straps the tongue is secured. The several frame-sections 11 and 12 are braced at the front and rear by angular straps 20, which straps are secured at their ends to the front and rear ends of the center bar of each section and to the shaft above the yoke 17, as best shown in Figs. 4 and 5. On the rear of the shaft 18 a seat, 21, is secured, which seat is adapted to project rearward beyond the frame.

Each of the sections 11 and 12 is thus divided into sub-sections 22 and 23, and in each of the said sub-sections a series of parallel shafts, 24 and 25, are journaled, the shafts of one section not aligning with the shafts of the other sections, although the shafts need not be confined to such arrangement, as they may be made to align without departing from the spirit of that part of the invention. These several shafts 24 and 25 are journaled to the respective side and central beams through the medium of a bearing, 26, which bearing at its lower end is more or less cup-shaped, being provided with a horizontal bore extending partially through and adapted to receive the ends of the shafts, each of which shafts is provided with a collar, 27, fitting into a recess produced in the bearing at the mouth of the bore. It will be observed that when the shaft is thus journaled dirt is prevented from collecting around and about its bearing-surface, and that the shaft is also prevented from moving endwise. The bearing-block 26 is also provided with a vertical groove, 42, which groove is made to intersect the longitudinal bore and is adapted to supply oil to the journal revolving in the said bore.

Upon the shafts 24 and 25 colters 28 are securely fixed, which colters are so located that the colters upon one shaft will be intermediate of those upon the adjacent shafts. This may be effected as shown in the sub-section 23 of the section 11, wherein two colters are fixed upon the central shaft and a single colter upon the shaft at each side of the center, the side colters being adapted to intervene the two central colters, or as shown in the sub-section 22, wherein one colter is made to intervene the two central colters, the forward colter being placed upon its shaft, so as to intervene the outer of the central colters and the outer side beam.

The colters upon the forward shaft are made larger than those upon the other shafts, whereby ditch-workers are obtained, which, dropping in the ditch, deliver the dirt to the rows of plants cultivated, and it will be observed that in Fig. 7 the position of the large colters is slightly changed. Ordinarily, as for cultivating listed corn, the arrangement set forth in said figure is preferred, as the large colters must for this purpose travel close to, if not in, the ditch at the side of the ridge, and by inclining the shaft carrying the said colters, as hereinafter set forth, the latter are compelled to push the earth from the ridge to the corn.

The bearings 26 are provided with horizontal projections 29, one upon each side, in which projections a longitudinal slot, 30, is cut, said bearings being adjustably held to the several beams by means of set-screws passing through the slots 30 into the said beams. Thus instead of having the shaft transversely of the several sub-sections the same may be made to extend diagonally from one beam to the other, as shown in dotted lines in Fig. 1.

A table or platform, 31, is held above the colters by means of the essentially U-shaped braces 32, which braces are attached near the front and the rear to the several sections 11 and 12, the purpose of the said table or platform being to receive the weight or weights, whereby the colters may be buried more or less deeply in the ground.

A lug, 33, is projected vertically upward from the forward end of the central beam of each section 11 and 12, and to said lug one end of a shovel-carying rod, 34, is adjustably pivoted, which rod, extending toward the rear below the table 31, is curved downward and detachably attached to an angle point or shovel, 35, as best shown in Figs. 1 and 4. If, however, it be found advisable to remove the angle or double shovel, a single shovel, 36, may be substituted, which shovel is illustrated in Figs. 2 and 3, wherein it will be seen that one of the said shovels is adapted for the right-hand section and the other for the left-hand section.

The shovel-carrying rod 34 is rendered adjustable by means of a lever, 37, having an attached catch, 38, which lever is pivoted in a vertical post or standard, 39, located upon the central beam of each section at the rear, upon the upper edge of which post or standard a segmental rack, 40, is secured. The lever 37 is an angle or elbow lever, and the short or horizontal arm is attached to the shovel-carrying bar by means of a link, 41. Thus a person standing on the platform, by the manipulation of the said lever 37, may elevate the points or shovels 35 or 36, whichever are employed, any desired distance from the ground.

When arranged for use as a harrow, a colter is arranged between the inner beams of the sections 11 and 12, as shown in Fig. 1, which colter is removed when the machine is used as a cultivator, as illustrated in Fig. 7.

Having thus fully described my invention, I claim as new and desire to secure by Letters Patent—

1. A harrow-section divided into longitudinal sub-sections provided with non-aligning shafts journaled in said sub-sections, and colters on the said shafts, the colters of one shaft being intermediate of those on the adjacent shafts, substantially as and for the purpose specified.

2. In a harrow, a harrow-section provided with longitudinal sub-sections, non-aligning shafts adjustably journaled in the said sub-sections, and colters on the said shafts, the colters on one shaft being intermediate of those on the adjacent shafts, substantially as and for the purpose specified.

3. A harrow-section divided into longitudinal sub-sections, non-aligning shafts adjustably journaled in said sub-sections, colters rigidly attached to the said shafts, the colters on one shaft being intermediate of those upon the adjacent shafts, and the forward colters being of a greater diameter than the remaining colters, as and for the purpose specified.

4. The combination, with harrow-sections united by a yoke and divided into longitudinal sub-sections, and non-aligning shafts adjustably journaled in said sub-sections, of colters fixed upon said shafts, the colters on one shaft being intermediate of those on the adjacent shafts and the forward colters of greater diameter than the remaining colters, a shovel-carrying bar adjustably pivoted to each section extending rearwardly from the same, shovels attached to the said bar, and means, substantially as shown and described, for raising and lowering said shovel-carrying bar, as and for the purpose specified.

5. A harrow-section divided into longitudinal sub-sections provided with shafts journaled in said sub-sections and colters on the said shafts, the colters of one shaft being intermediate of those on the adjacent shaft, substantially as and for the purpose specified.

6. In a harrow, a harrow-section provided with longitudinal sub-sections, shafts adjustably journaled in the said sub-sections, and colters on the said shafts, the colters on one shaft being intermediate of those on the adjacent shafts, substantially as and for the purpose specified.

7. A harrow-section divided into longitudinal sub-sections, shafts adjustably journaled in said sub-sections, colters rigidly attached to the said shafts, the colters on one shaft being intermediate of those upon the adjacent shafts, and the forward colters being of a greater diameter than the remaining colters, as and for the purpose specified.

8. The combination, with harrow-sections united by a yoke and divided into longitudinal sub-sections, and shafts adjustably journaled in said sub-sections, of colters fixed upon said shafts, the colters on one shaft being intermediate of those on the adjacent shafts and the forward colters of greater diameter than the remaining colters, a shovel-carrying bar adjustably pivoted to each section extending rearwardly from the same, shovels attached to the said bar, and means, substantially as shown and described, for raising and lowering said shovel-carrying bar, as and for the purpose specified.

9. In a harrow, a harrow-section provided with longitudinal sub-sections, shafts adjustably journaled in the said sub-sections to shift them from a transverse to a diagonal position, and colters on said shafts, substantially as and for the purpose specified.

10. The combination, with harrow-sections united by a yoke extended above the harrow and divided into longitudinal sub-sections, shafts adjustably journaled in said sub-sections, colters fixed upon said shafts, a shovel-carrying bar adjustably pivoted to each section extending rearwardly from the same, shovels attached to the said bar, and means, substantially as shown and described, for raising and lowering said shovel-carrying bar, as and for the purpose specified.

ANDREW J. ADAMSON.

Witnesses:
   C. T. WHITTENHALL,
   A. L. AUSTIN.